United States Patent
Negi et al.

(10) Patent No.: US 9,843,768 B1
(45) Date of Patent: Dec. 12, 2017

(54) AUDIENCE ENGAGEMENT FEEDBACK SYSTEMS AND TECHNIQUES

(71) Applicant: Intel Corporation, Santa Clara, CA (US)

(72) Inventors: Ansuya Negi, Beaverton, OR (US); Igor Tatourian, Fountain Hills, AZ (US); Rita H Wouhaybi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/274,338

(22) Filed: Sep. 23, 2016

(51) Int. Cl.
| | |
|---|---|
| H04N 7/15 | (2006.01) |
| H04L 29/06 | (2006.01) |
| H04L 29/08 | (2006.01) |
| G10L 15/08 | (2006.01) |
| G10L 25/63 | (2013.01) |
| H04H 60/33 | (2008.01) |

(52) U.S. Cl.
CPC ............... *H04N 7/15* (2013.01); *G10L 15/08* (2013.01); *G10L 25/63* (2013.01); *H04H 60/33* (2013.01); *H04L 65/403* (2013.01); *H04L 67/10* (2013.01); *G10L 2015/088* (2013.01)

(58) Field of Classification Search
None
See application file for complete search history.

(56) References Cited

U.S. PATENT DOCUMENTS

| 2013/0205314 | A1* | 8/2013 | Ramaswamy | ... H04N 21/44213 725/14 |
| 2013/0339875 | A1* | 12/2013 | Sahai | .......... H04L 12/1827 715/753 |
| 2014/0237381 | A1* | 8/2014 | Socolof | .......... G06Q 10/02 715/752 |
| 2014/0278933 | A1* | 9/2014 | McMillan | .......... G06Q 30/0246 705/14.45 |
| 2016/0086205 | A1* | 3/2016 | Dove | .......... H04L 67/306 705/7.32 |
| 2016/0255384 | A1* | 9/2016 | Marci | .......... H04N 21/84 725/12 |

* cited by examiner

*Primary Examiner* — Creighton Smith
(74) *Attorney, Agent, or Firm* — Schwegman Lundberg & Woessner, P.A.

(57) ABSTRACT

Embodiments of a system and method for indicating audience engagement are generally described herein. A method may include sending speech from a speaker to be played for a plurality of members of an audience, receiving audience reaction information, for the plurality of members of the audience, from a plurality of sensors, the audience reaction information captured by the plurality of sensors while the speech is playing for the plurality of members of the audience, processing the audience reaction information to aggregate the audience reaction information, determining, using the processed information, an engagement factor, and sending an aggregated engagement level indicator to a speaker device, the aggregated engagement level indicator based on the engagement factor and indicating overall engagement of the audience to the speech.

24 Claims, 6 Drawing Sheets

AUDIENCE ENGAGEMENT FEEDBACK SYSTEMS AND TECHNIQUES

BACKGROUND

A person communicating with other people, such as on a conference call, often has communication issues when audience reaction is difficult to determine. A person attempting to get across an idea is not always understood as intended when the person starts trying to communicate the idea. This type of misunderstanding may lead to unintended consequences or results. Clear communication is a crucial success factor for people involved in day-to-day conferencing and collaboration. While talking to an audience live, it is often easier for a speaker to see and correct misunderstandings. Unfortunately in remote sessions, a speaker is relatively isolated and may "miss the audience" or fail to get a point across. Solutions, such as relying on the audience to interrupt the person to tell the person that the idea is unclear, have low accuracy and are limited to the ability of the audience to notify the person that there has been a misunderstanding.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
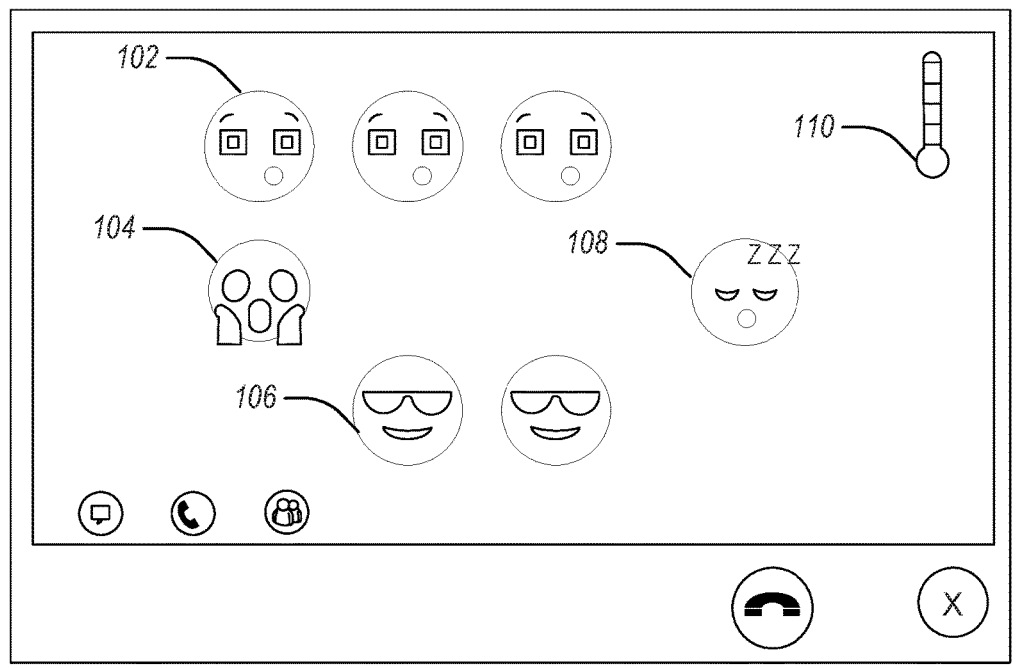
FIG. 1 illustrates a conference call user interface including an aggregated engagement level indicator and a plurality of individual audience engagement level indicators in accordance with some embodiments.

Systems and methods for indicating audience engagement are described herein. The systems and methods described herein may include using a user interface for displaying various indications of audience engagement. In an example, a system described herein may use a camera and computer vision to recognize facial emotions, may use or wearable sensors to gauge electrical body response, remote heart monitoring, or other sensor capabilities. Captured information may be aggregated and anonymized and serve as inputs into an engagement process. The system may collect facial emotions, body gesturing, or body response and aggregates these or other emotional indicators into a feedback based engagement process.

In an example, the system may output an anonymized indication of audience emotional response to a speaker (or presenter), or regarding the content of presentation. The audience emotional response may be represented via a color-coded thermometer bell, emoticons or emoji's (e.g., an emotional representation such as a yellow smiley face), or by other visual means. In another example, a speaker may use a virtual reality headset, and audience emotional response may be represented as 3D avatars with changing expressions, such as smiling, bored, etc. In yet another example, the system may provide feedback to emails and articles. For example the system may display an article and monitor a reader's engagement. The monitored and stored information may be anonymized and reported to an author. The system may be used for measuring interest in movies or TV shows. A state machine middleware may be used to record changing interest and to tie the changing interest to content or to a presenter's voice. As a presenter gives a talk, the presenter or the audience may see the engagement indication. The system may include a set of predefined audience profiles (e.g., analogous to workload for a server) and a speaker may practice giving a speech to different audiences. The feedback given to the speaker may be directed to allowing the speaker to adjust the speech based on the predictive output. For example, a fresh graduate may practice a speech before an interview with a company and receive coaching feedback. The system may collect emotional feedback from many participants in a teleconference and collate the responses to form an idea of the success of a meeting. Participants may opt-in and the system may identify and alert a presenter or observer to situations where the meeting had issues, broke down, or failed, such as when there was no consensus established in the meeting. In another example, the participant opt-in may be used to allow provided information to be public (e.g., not anonymous). The system may point out cultural differences that may be affecting a speech or meeting and lead the participants towards internationally or culturally preferred language.

A user may share success or failure regarding audience engagement with other users by uploading the data to the cloud or tagging the audience engagement with relevant keywords. For example, an applicant to a hardware engineer position at a company may share the reaction and outcome of an interview with others on a job website. The service may then show that the interviewers tended to be serious and not appreciate jokes during a presentation or that sports references were viewed favorably. The data may be analyzed by different parties for different outcomes. For example, a human resources department may analyze the data to understand some characteristics of successful applicants for use in future postings. This may result in a more efficient hiring process. In another example, an audience may receive feedback, such as by sending information to a student that other students are also frustrated or do not understand a professor, or that other audience members are angry, happy, etc. In an example, a system may be used with a child or a person with autism or special needs to detect certain changes in mood, emotion, or behavior that may be otherwise undetectable by a person.

The systems and methods described herein may be include an opt-in option for an audience member to make suggestions or provide information such that a speaker may tailor a speech with a predicted likelihood of success. In another example, an email or a blog post may be used with a mock audience or a sample audience to give feedback and automatically determine an emotional engagement of a potential or actual reader.

The problems of misunderstanding a speaker exist in remote communication and in direct in-person communication, such as for a lecturer or business presenter. For example, a presenter may use too much jargon or terms of art for a wider audience. In another example, the systems and methods described herein may be applied for direct in-person communication. For example, a business presenter may be giving a presentation, such as a sales presentation, presentation at a board meeting, corporate meeting, etc., and may view an emotional engagement indicator on a personal device while giving the presentation.

FIG. 1 illustrates a conference call user interface 100 including an aggregated engagement level indicator 110 and a plurality of individual audience engagement level indicators (e.g., 102-108) in accordance with some embodiments. The aggregated level indicator 110 may be a representation of a thermometer, as shown in FIG. 1, or other indicator, such as a dial, progress bar, or other visual representation. The aggregated level indicator 110 may represent an average, a weighted average, an aggregation, sample set, or other combination of emotional engagement metrics of audience members. For example, the aggregated level indicator 110 may represent an average engagement of audience members represented on the conference call user interface 100 (e.g., represented by the individual audience engagement level indicators 102-108) or an average engagement of audience members not represented. The individual audience engagement level indicators 102-108 may include emojis, emoticons, avatars, text representations, or other visual representations of an emotion, such as an interested emoji 102, a surprised emoji 104, a content or happy emoji 106, or a disengaged emoji 108. Additional complexities in emotional display may be used by a variety of emojis or the like. For example, colors may be used to indicate mood, while facial expressions of emojis represent engagement level.

In an example, the conference call user interface 100 may include long-term learning or prediction based on aggregated data in the cloud from multiple users of the conference call user interface 100. For example, when speakers upload their data to the cloud, the conference call user interface 100 may become trained with the data and predict an outcome. A speaker may then rehearse a pitch using the conference call user interface 100 with no audience and receive feedback from the aggregated level indicator 110. The speaker may specify an audience based on context (e.g., location, ages, affiliations, level of expertise in the subject, etc.) or information may be extracted from a calendar of the speaker. The speaker may rehearse a talk and the conference call user interface 100 may predict a level of engagement or highlight areas to be worked on based on previous data of a sample or mock audience. Other elements may be factored in to the prediction or aggregated level indicator 110, such as the context of the speaker (e.g., is the speaker going to be nervous, is the speaker going to be sleep deprived, etc.) or other environmental factors (e.g., is the venue or podium a place where speakers tend to get hot, is the amount of light going to hurt the performance of the speaker, etc.). Based on the data, the conference call user interface 100 may provide a predictive success metric.

In an example, the conference call user interface 100 may be used by each individual participant. In an example, the conference call user interface 100 may be implemented on a mobile device, smartphone, smart device, computer (e.g., video conferencing or audio conferencing), or the like. In an example, individual emoticons may be generated for audience members and displayed as individual audience engagement level indicators (e.g., 102-108) for feedback. In another example, anonymous feedback may be presented to a speaker, such as using aggregated results. For example, if an audience is big enough, (e.g., an auditorium full of high schoolers), the conference call user interface 100 may provide feedback based on demographics, such as a separate indicator for age, gender, interest (e.g., science interest or humanities interest or art interest), or the like. In another example, language specific demographics may be used, such as indicating that a speaker insulted people from a certain ethnic background. The demographics may be aggregated over previous speeches, such as to develop a pattern over different speeches, including by using machine learning. In an example, the conference call user interface 100 may collect inputs and correlating audio tones or key words with a particular emotions, such as by using machine learning. The conference call user interface 100 may use a practice speech to predict emotional reactions (e.g., a practice speech without an audience).

In an example, the aggregated level indicator 110 may be displayed as a thermometer to show overall engagement. A plurality of aggregated level indicators (e.g., 110) may be used to show separate engagement levels for different types of speech (e.g., healthcare, education, information, etc.), different types of audience (e.g., based on demographics, number of members, etc.), different types of desired engagement levels (e.g., a speech intended to inspire a crowd, a speech intended to calm an audience, a speech intended to convey factual information without eliciting an emotional response, etc.), or the like.

In another example, the conference call user interface 100 may inform a speaker as to which audiences would be better suited for a particular speech or suggest modifications to the speech based on predicted (or pre-signed up) audience. The conference call user interface 100 may tailor a lecture per time or per hour, such as for different student groups or classes. The conference call user interface 100 may provide feedback after the speech is given (or after a series of speeches are given, such as lectures over a period of semesters or years), such as the overall engagement.

Figure 2:
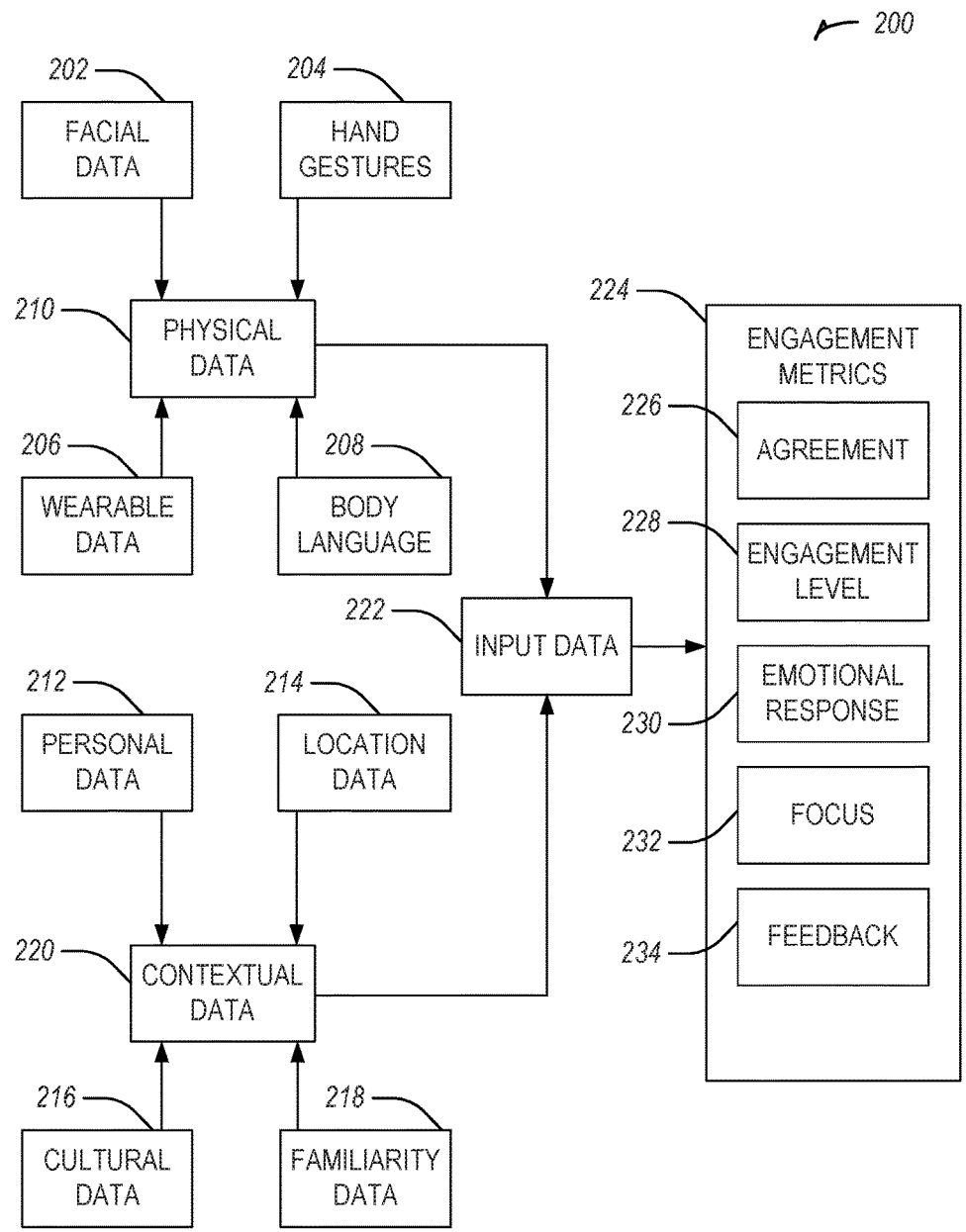
FIG. 2 illustrates a block diagram showing physical (e.g., sensor-based) inputs and contextual inputs used to evaluate engagement metrics in accordance with some embodiments.

FIG. 2 illustrates a block diagram 200 showing physical (e.g., sensor-based) inputs (e.g., 202-208) and contextual inputs (e.g., 212-218) used to evaluate engagement metrics 224 in accordance with some embodiments. The physical inputs may include facial data 202, hand gestures 204, wearable data 206, or body language 208. These inputs may be aggregated, averaged, weighted, or anonymized to create a physical data structure 210. One or more of these inputs may be ignored or not used for a given time when determining a physical data structure 210. The physical data structure 210, along with a contextual data structure 220 may be used as an input data structure 222. The physical data structure 210 and the contextual data structure 220 may be combined as an average, weighted average, etc. The contextual data structure 220 may include personal data 212, location data 214, cultural data 216, or familiarity data 218. These data inputs may be ignored or not used for a given time in determining the contextual data structure 220. The input data structure 222 may be used to determine engagement metrics 224. The engagement metrics 224 may include agreement 226, engagement level 228, emotional response 230, focus 232, or feedback 234.

In an example, the facial data 202 includes information about facial expressions, such as smiling, frowning, squinting, etc. The hand gestures 204 may include predetermined hand gestures, or may include information about whether hand gestures are made or not. The wearable data 206 may include a heartrate, oxygen saturation, amount of movement, etc. The body language 208 may include posture information, orientation, etc. The personal data 212 may include demographic information, such as age, gender, etc. The location data 214 may include a current location, an origin location, etc. (e.g., location data 214 may indicate that an audience member is currently traveling). The cultural data 216 may include a country of origin, self-identified ethnic or cultural groups (e.g., religion), generation, etc. The familiarity data 218 may include familiarity with the speaker, the topic, the speech itself (e.g., an audience member who is part of a team working on similar subject matter, or someone that helped write the speech), a company of the speaker, or the like.

In an example, the engagement metric 224 may be determined or displayed separately or in any combination. For example, agreement 226 may be displayed using a first indicator, and an average of the remaining factors may be displayed using a second indicator. Other combinations may be used. The agreement 226 metric may include a determined amount of agreement with a statement or statements made by a speaker. The engagement level 228 metric may include a level of interest in a statement or speech. The emotional response 230 may include an emotional connection or response (intended or not intended by the speaker) to a statement or speech. The focus 232 metric may represent an amount of attention being paid to a statement or speech. The feedback 234 metric may include audience member submitted feedback, automatically determined feedback (e.g., based on previously input desired responses from the audience), or the like. The engagement metrics 224 may be displayed for a single audience member, a subset of members of an audience, or the audience as a whole. The engagement metrics 224 may be based on one or more of the physical data 210 or the contextual data 220, which may be based on one or more of the sub-inputs (e.g., 202-208 for physical data or 212-218 for contextual data). Each engagement metric of the engagement metrics 224 may be based on the same or different inputs or combinations of inputs.

This block diagram 200 displays a quantification of human engagement metrics 224 using metrics or weighted metrics to monitor participants over time. The human emotions may include collective indicators taken from facial expressions, body language, gestures, and sensor responses as well as contextual data. User input may be monitored to understand and measure body language responses. Physical data 210 may include posture, eye gazing, hand positions, head tilt and so on. Contextual data may include demographics such as age, gender, age, time of day, day of week, location, expertise, cultural background, for example, to normalize different reactions based on the topics and other human and cultural variations. An input may be assigned a weight depending upon a situation and a collective set of metrics (e.g., the engagement metrics 224) may be deduced. In an example, feedback 234 may include participants asking questions, or sending online messages or emails. There may be an incentive for a participant to choose to share wearable data, for example, (e.g. students taking a class, friends helping a speaker rehearse, etc.). The data described above may be aggregated to maintain the privacy of the audience. In an example, the aggregated data may be binned or profiled based on the different demographics or inputs extracted from the context and demographics. In an example, the feedback 234 may provide recommendations based on input data, such as location data 214. In an example, the geography of a participant or potential cultural references may be presented or local news may be determined. For example, when talking to participants in India, use a cricket reference, or when talking to participants in the U.S., use a baseball reference. Other examples may include using a day of week, time of day, age, gender, etc., to display feedback (e.g., one feedback for teenagers, or another feedback for older audience).

Figure 3:
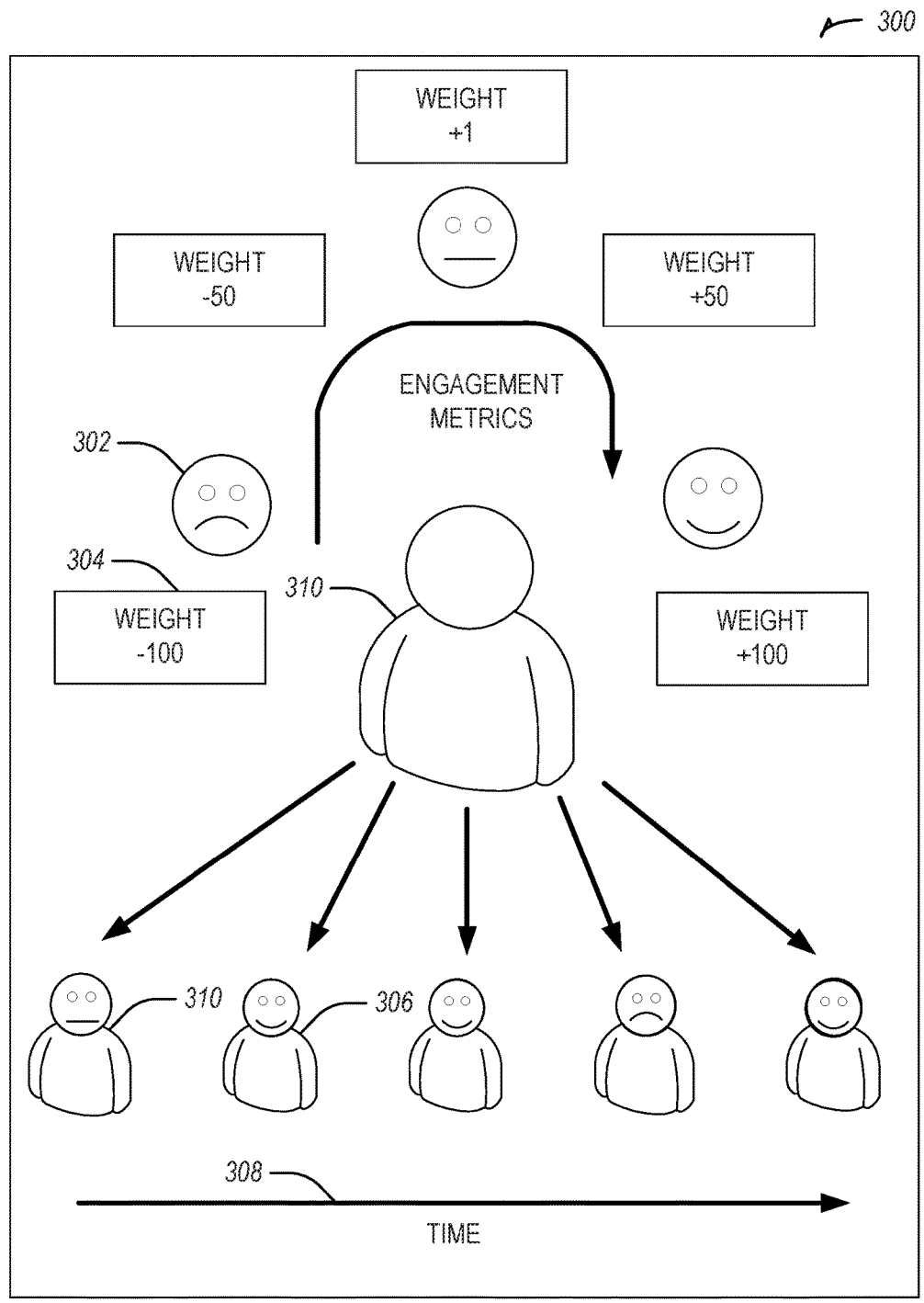
FIG. 3 illustrates a diagram showing display indicators for audience engagement levels in accordance with some embodiments.

FIG. 3 illustrates a diagram 300 showing display indicators (e.g., 302, 306, 310) for audience engagement levels in accordance with some embodiments. The diagram 300 includes an example set of inputs (e.g., 302) weighted according to predetermined weights (e.g., 304), that may be shown over time on a user interface (e.g., using indicator 306 or 310). In an example, the current displayed indicator 306 may be determined using a cumulative weighted average of inputs, such as input 302 according to weights (e.g., weight 304). In an example, the cumulative weighted average of inputs may be cumulative over audience members (e.g., aggregating or averaging a number of audience members for a given time) or may be cumulative over time (e.g., a single audience member over time, a subset of audience members over time, the audience as an aggregate over time, etc.). In another example, engagement metrics for specific members of an audience may be given more weight (e.g., a decision maker is given more weight than an intern).

The inputs (e.g., 302) may be emoticons or emojis, and may be output along a timeline 308. The timeline 308 may include past information or the displayed indicator 306 may change over time (e.g., timeline 308 represents changes over time, with a single emoticon or emoji shown at a time). The timeline 308 may start with a neutral input (e.g., input 310) and change according to the inputs (e.g., 302).

Figure 4:
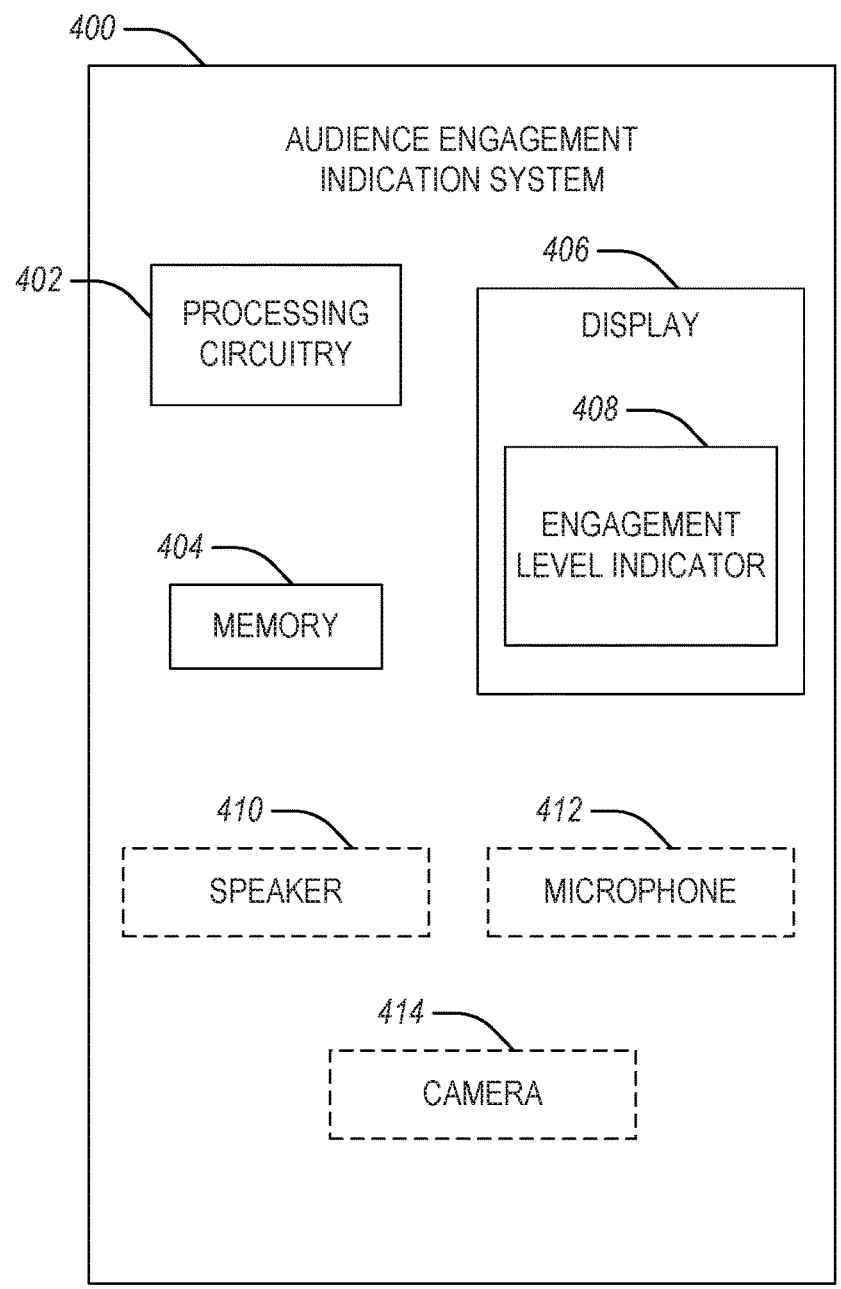
FIG. 4 illustrates a system for indicating audience engagement in accordance with some embodiments.

FIG. 4 illustrates a system 400 for indicating audience engagement in accordance with some embodiments. The system 400 includes processing circuitry 402, memory 404, a display 406. The system 400 may include a speaker 410 or a microphone 412. The display 406 includes an engagement level indicator 408, such as the engagement level indicator 110 of FIG. 1. The system 400 may include a server, a cloud system, or a computing device.

The processing circuitry 402 may be used to send speech from a speaker to be played for a plurality of members of an audience. In an example, the processing circuitry 402 is used to receive audience reaction information, for the plurality of members of the audience, from a plurality of sensors, the audience reaction information captured by the plurality of sensors while the speech is playing for the plurality of members of the audience, process the audience reaction information to aggregate the audience reaction information, determine, using the processed information, an engagement factor, and send an aggregated engagement level indicator 408 to a speaker device, the aggregated engagement level indicator 408 based on the engagement factor and indicating overall engagement of the audience to the speech.

In an example, the display 406 may include a user interface for displaying the engagement level indicator 408. In an example, the audience engagement indication system 400 may include components remote from each other, such as including the processing circuitry 402 on a server and the display 406 on a speaker device. In another example, a technique may be implemented using multiple audience engagement indication systems 400, for example, a server used to process the information and a speaker device for receiving an aggregated engagement level indicator 408 and displaying the aggregated engagement level indicator 408. In an example, the audience engagement indication system 400 may include a camera 414 for capturing video of a presenter. In an example, the camera 414 may capture physical responses of at least one of the plurality of members of the audience while the speech is playing. The physical responses may include a facial emotion, a body gesture, or a hand gesture. The microphone 412 may be used to capture audio of a presenter.

The audience engagement indication system 400 may receive information from a sensor or sensors of a wearable device or wearable devices, such as biometric data from at least one of the plurality of members of the audience while the speech is playing. The audience reaction information may be received at the audience engagement indication system 400 from at least one of the plurality of members of the audience in response to the at least one of the plurality of members of the audience opting in to provide data. The selection to opt in may be saved in the memory 404. The display 406 may include a specific engagement level indicator 408 for the opted in member, an engagement level indicator 408 for the audience as a whole, or the like. The engagement level indicator 408 may include an emoticon, an emoji, a 3D avatar, or the like. In an example, the engagement level indicator 408 may be updated in real time on the display 406, and the real time updates may be adjusted based on received updated audience reaction information.

In an example, the processing circuitry 402 may anonymize the audience reaction information. The anonymized audience reaction information may be saved in the memory 404. The data received from the plurality of members of the audience may include location data, personal data, cultural data, familiarity data, time data, age data, gender data, or the like. This data may be saved in a structured database in the memory 404 of the audience engagement indication system 400.

In an example, the processing circuitry 402 may save the processed information and the speech to the memory 404. The processing circuitry 402 may correlate audio tones or key words in the speech with emotional responses in the processed information using machine learning based on stored speech and processed information. In an example, the processing circuitry 402 may predict emotional reactions of a hypothetical audience to a second speech using the correlated audio tones or key words. In an example, the processing circuitry 402 may suggest modifications to the second speech based on the predicted emotional reactions of the hypothetical audience. In another example, the processing circuitry 402 may send the aggregated engagement level indicator 408 to a device of a member of the plurality of members of the audience.

Figure 5:
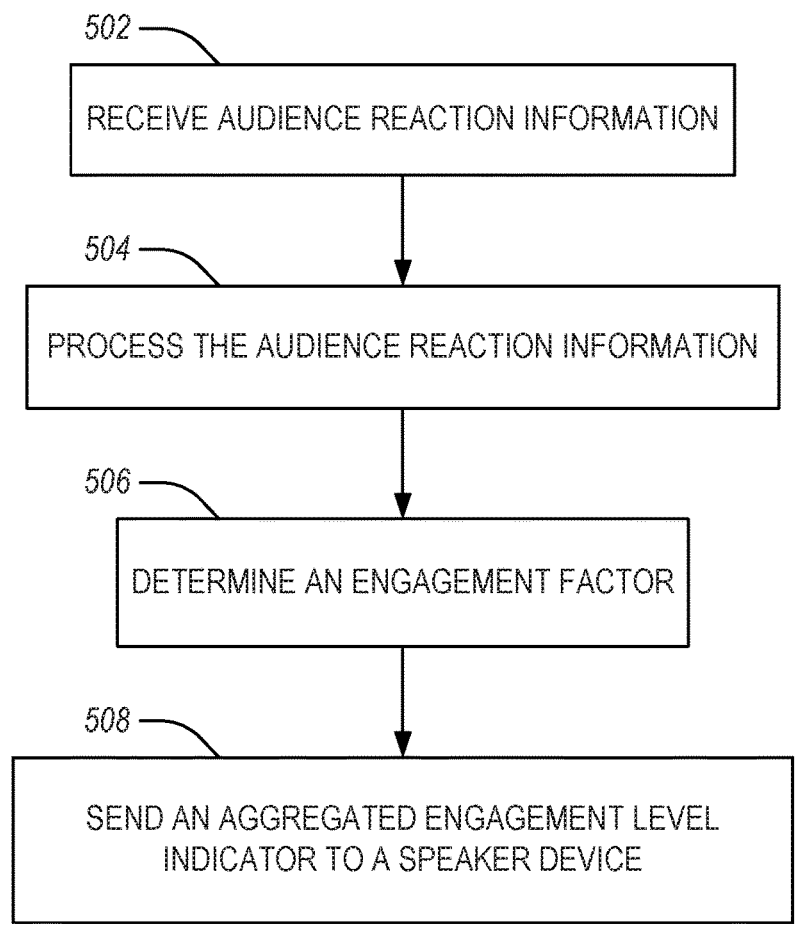
FIG. 5 illustrates a flowchart showing a technique for indicating audience engagement in accordance with some embodiments.

FIG. 5 illustrates a flowchart showing a technique 500 for indicating audience engagement in accordance with some embodiments. The technique 500 includes an operation 502 to receive audience reaction information. The audience reaction information may be in reaction to speech sent from a speaker (e.g., a presenter or other person) to be played for a plurality of members of an audience. The audience reaction information may be received for the plurality of members of the audience, such as from a plurality of sensors. In an example, the audience reaction information is captured by the plurality of sensors while the speech is playing for the plurality of members of the audience. In another example, the audience reaction information may be captured after the speech has been played. In yet another example, the audience reaction information may include pre-speech, during speech, or post-speech information, such as a change in reaction measured from a baseline.

In an example, the speech may include a video of the speaker. In another example, the speaker may be remote from the audience. In an example, the plurality of sensors may include a camera. The camera may capture physical responses of at least one of the plurality of members of the audience, such as while the speech is playing. The physical response may include at least one of a facial emotion, a body gesture, or a hand gesture. In another example, the plurality of sensors may include a wearable sensor. The wearable sensor may capture biometric data from at least one of the plurality of members of the audience, such as while the speech is playing. In an example, the audience reaction information may be received from at least one of the plurality of members of the audience in response to the at least one of the plurality of members of the audience opting in to provide data in an individual or an aggregated form.

The technique 500 includes an operation 504 to process the audience reaction information. The audience reaction information may be processed to aggregate the audience reaction information. Processing the audience reaction information may include anonymizing the audience reaction information. The technique 500 includes an operation 506 to determine an engagement factor. The engagement factor may be determined using the processed information. Determining the engagement factor may include using data of the plurality of members of the audience. The data may include location data, personal data, cultural data, familiarity data, time data, age data, or gender data.

The technique 500 includes an operation 508 to send an aggregated engagement level indicator to a speaker device. The aggregated engagement level indicator may be based on the engagement factor. In an example, the aggregated engagement level indicates an overall engagement of the audience to the speech. In an example, the overall engagement of the audience to the speech may include an average or a weighted average of engagement of the plurality of members of the audience. Sending the aggregated engagement level indicator may include sending a plurality of aggregated engagement level indicators corresponding to the plurality of members (e.g., to be displayed on the speaker device). In an example, the aggregated engagement level may include an emoticon, an emoji, or a 3D avatar. In another example, sending the aggregated engagement level indicator may include sending a series of aggregated engagement level indicators in real time updates to the speaker device. The real time updates may be adjusted based on aggregated or individual received updated audience reaction information. For example, an emoji may appear to change over time in reaction to speech by the speaker changing.

In an example, the technique 500 includes an operation to save the processed information and the speech to memory. The technique 500 may include an operation to correlate audio tones or key words in the speech with emotional responses in the processed information, such as by using machine learning. Correlating audio tones or key words may include using a time offset to account for a transmission delay or a language barrier issue. Emotional reactions may be predicted of a hypothetical audience to a second speech, such as by using the correlated audio tones or key words or previous reactions from past audiences stored in the memory. In an example, modifications may be suggested to the second speech, such as modifications based on the predicted emotional reactions of the hypothetical audience. In another example, the technique 500 includes an operation to send the aggregated engagement level indicator to a device of a member of the plurality of members of the audience.

Figure 6:
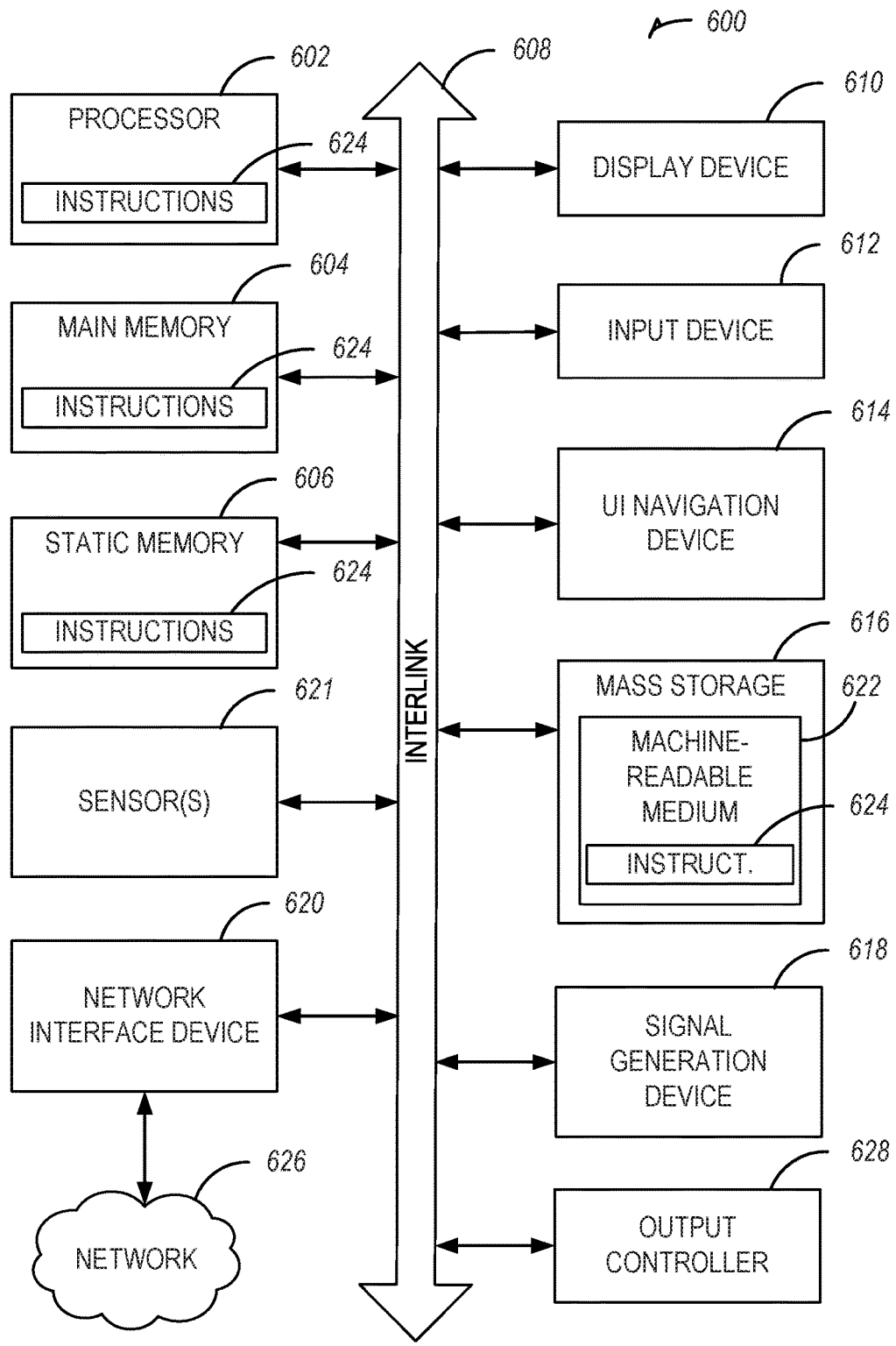
FIG. 6 illustrates generally an example of a block diagram of a machine upon which any one or more of the techniques (e.g., methodologies) discussed herein may perform in accordance with some embodiments.

FIG. 6 illustrates generally an example of a block diagram of a machine 600 upon which any one or more of the techniques (e.g., methodologies) discussed herein may perform in accordance with some embodiments. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, alphanumeric input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 that is non-transitory on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

VARIOUS NOTES & EXAMPLES

Each of these non-limiting examples may stand on its own, or may be combined in various permutations or combinations with one or more of the other examples.

Example 1 is a system for indicating audience engagement, the system comprising: a server, including processing circuitry and memory, the processing circuitry to: send speech from a speaker to be played for a plurality of members of an audience; receive audience reaction information, for the plurality of members of the audience, from a plurality of sensors, the audience reaction information captured by the plurality of sensors while the speech is playing for the plurality of members of the audience; process the audience reaction information to aggregate the audience reaction information; determine, using the processed information, an engagement factor; and send an aggregated engagement level indicator to a speaker device, the aggregated engagement level indicator based on the engagement factor and indicating overall engagement of the audience to the speech.

In Example 2, the subject matter of Example 1 optionally includes wherein the speech includes a video of the speaker.

In Example 3, the subject matter of any one or more of Examples 1-2 optionally include wherein the speaker is remote from the audience.

In Example 4, the subject matter of any one or more of Examples 1-3 optionally include wherein the plurality of sensors include a camera, the camera to capture physical responses of at least one of the plurality of members of the audience while the speech is playing.

In Example 5, the subject matter of Example 4 optionally includes wherein the physical responses include at least one of a facial emotion, a body gesture, or a hand gesture.

In Example 6, the subject matter of any one or more of Examples 1-5 optionally include wherein the plurality of sensors include a wearable sensor, the wearable sensor to capture biometric data from at least one of the plurality of members of the audience while the speech is playing.

In Example 7, the subject matter of any one or more of Examples 1-6 optionally include wherein the audience reaction information is received from at least one of the plurality of members of the audience in response to the at least one of the plurality of members of the audience opting in to provide data in an individual or an aggregated form.

In Example 8, the subject matter of any one or more of Examples 1-7 optionally include wherein to process the audience reaction information, the processing circuitry is to anonymize the audience reaction information.

In Example 9, the subject matter of any one or more of Examples 1-8 optionally include wherein to determine the engagement factor includes using data of the plurality of members of the audience, the data including at least one of location data, personal data, cultural data, familiarity data, time data, age data, or gender data.

In Example 10, the subject matter of any one or more of Examples 1-9 optionally include wherein to send the aggregated engagement level indicator, the processing circuitry is to send a plurality of aggregated engagement level indicators corresponding to the plurality of members.

In Example 11, the subject matter of any one or more of Examples 1-10 optionally include wherein the aggregated engagement level indicator is an emoticon.

In Example 12, the subject matter of any one or more of Examples 1-11 optionally include wherein the aggregated engagement level indicator is a 3D avatar.

In Example 13, the subject matter of any one or more of Examples 1-12 optionally include wherein the overall engagement of the audience to the speech is a weighted average of engagement of the plurality of members of the audience.

In Example 14, the subject matter of any one or more of Examples 1-13 optionally include wherein to send the aggregated engagement level indicator, the processing circuitry is to send a series of aggregated engagement level indicators in real time updates to the speaker device, the real time updates adjusted based on aggregated or individual received updated audience reaction information.

In Example 15, the subject matter of any one or more of Examples 1-14 optionally include wherein the processing circuitry is further to: save the processed information and the speech to the memory; and correlate audio tones or key words in the speech with emotional responses in the processed information using machine learning, wherein to correlate includes using a time offset to account for a transmission delay.

In Example 16, the subject matter of Example 15 optionally includes wherein the processing circuitry is further to predict emotional reactions of a hypothetical audience to a second speech using the correlated audio tones or key words and previous reactions from past audiences stored in the memory.

In Example 17, the subject matter of Example 16 optionally includes wherein the processing circuitry is further to suggest modifications to the second speech based on the predicted emotional reactions of the hypothetical audience.

In Example 18, the subject matter of any one or more of Examples 1-17 optionally include wherein the processing circuitry is further to send the aggregated engagement level indicator to a device of a member of the plurality of members of the audience.

Example 19 is a method for indicating audience engagement, the method comprising: sending speech from a speaker to be played for a plurality of members of an audience; receiving audience reaction information, for the plurality of members of the audience, from a plurality of sensors, the audience reaction information captured by the plurality of sensors while the speech is playing for the plurality of members of the audience; processing the audience reaction information to aggregate the audience reaction information; determining, using the processed information, an engagement factor; and sending an aggregated engagement level indicator to a speaker device, the aggregated engagement level indicator based on the engagement factor and indicating overall engagement of the audience to the speech.

In Example 20, the subject matter of Example 19 optionally includes wherein the speech includes a video of the speaker.

In Example 21, the subject matter of any one or more of Examples 19-20 optionally include wherein the speaker is remote from the audience.

In Example 22, the subject matter of any one or more of Examples 19-21 optionally include wherein the plurality of sensors include a camera, the camera capturing physical responses of at least one of the plurality of members of the audience while the speech is playing.

In Example 23, the subject matter of Example 22 optionally includes wherein the physical responses include at least one of a facial emotion, a body gesture, or a hand gesture.

In Example 24, the subject matter of any one or more of Examples 19-23 optionally include wherein the plurality of sensors include a wearable sensor, the wearable sensor capturing biometric data from at least one of the plurality of members of the audience while the speech is playing.

In Example 25, the subject matter of any one or more of Examples 19-24 optionally include wherein the audience reaction information is received from at least one of the plurality of members of the audience in response to the at least one of the plurality of members of the audience opting in to provide data in an individual or an aggregated form.

In Example 26, the subject matter of any one or more of Examples 19-25 optionally include wherein processing the audience reaction information includes anonymizing the audience reaction information.

In Example 27, the subject matter of any one or more of Examples 19-26 optionally include wherein determining the engagement factor includes using data of the plurality of members of the audience, the data including at least one of location data, personal data, cultural data, familiarity data, time data, age data, or gender data.

In Example 28, the subject matter of any one or more of Examples 19-27 optionally include wherein sending the aggregated engagement level indicator includes sending a plurality of aggregated engagement level indicators corresponding to the plurality of members.

In Example 29, the subject matter of any one or more of Examples 19-28 optionally include wherein the aggregated engagement level indicator is an emoticon.

In Example 30, the subject matter of any one or more of Examples 19-29 optionally include wherein the aggregated engagement level indicator is a 3D avatar.

In Example 31, the subject matter of any one or more of Examples 19-30 optionally include wherein the overall engagement of the audience to the speech is a weighted average of engagement of the plurality of members of the audience.

In Example 32, the subject matter of any one or more of Examples 19-31 optionally include wherein sending the aggregated engagement level indicator includes sending a series of aggregated engagement level indicators in real time updates to the speaker device, the real time updates adjusted based on aggregated or individual received updated audience reaction information.

In Example 33, the subject matter of any one or more of Examples 19-32 optionally include saving the processed information and the speech to memory; and correlating audio tones or key words in the speech with emotional responses in the processed information using machine learning, wherein correlating includes using a time offset to account for a transmission delay.

In Example 34, the subject matter of Example 33 optionally includes predicting emotional reactions of a hypothetical audience to a second speech using the correlated audio tones or key words and previous reactions from past audiences stored in the memory.

In Example 35, the subject matter of Example 34 optionally includes suggesting modifications to the second speech based on the predicted emotional reactions of the hypothetical audience.

In Example 36, the subject matter of any one or more of Examples 19-35 optionally include sending the aggregated engagement level indicator to a device of a member of the plurality of members of the audience.

Example 37 is at least one machine-readable medium including instructions for operation of a computing system, which when executed by a machine, cause the machine to perform operations of any of the methods of Examples 19-36.

Example 38 is an apparatus comprising means for performing any of the methods of Examples 19-36.

Example 39 is an apparatus for indicating audience engagement, the apparatus comprising: means for sending speech from a speaker to be played for a plurality of members of an audience; means for receiving audience reaction information, for the plurality of members of the audience, from a plurality of sensors, the audience reaction information captured by the plurality of sensors while the speech is playing for the plurality of members of the audience; means for processing the audience reaction information to aggregate the audience reaction information; means for determining, using the processed information, an engagement factor; and means for sending an aggregated engagement level indicator to a speaker device, the aggregated engagement level indicator based on the engagement factor and indicating overall engagement of the audience to the speech.

In Example 40, the subject matter of Example 39 optionally includes wherein the speech includes a video of the speaker.

In Example 41, the subject matter of any one or more of Examples 39-40 optionally include wherein the speaker is remote from the audience.

In Example 42, the subject matter of any one or more of Examples 39-41 optionally include wherein the plurality of sensors include a camera, the camera capturing physical responses of at least one of the plurality of members of the audience while the speech is playing.

In Example 43, the subject matter of Example 42 optionally includes wherein the physical responses include at least one of a facial emotion, a body gesture, or a hand gesture.

In Example 44, the subject matter of any one or more of Examples 39-43 optionally include wherein the plurality of sensors include a wearable sensor, the wearable sensor capturing biometric data from at least one of the plurality of members of the audience while the speech is playing.

In Example 45, the subject matter of any one or more of Examples 39-44 optionally include wherein the audience reaction information is received from at least one of the plurality of members of the audience in response to the at least one of the plurality of members of the audience opting in to provide data in an individual or an aggregated form.

In Example 46, the subject matter of any one or more of Examples 39-45 optionally include wherein the means for processing the audience reaction information include means for anonymizing the audience reaction information.

In Example 47, the subject matter of any one or more of Examples 39-46 optionally include wherein the means for determining the engagement factor include means for using data of the plurality of members of the audience, the data including at least one of location data, personal data, cultural data, familiarity data, time data, age data, or gender data.

In Example 48, the subject matter of any one or more of Examples 39-47 optionally include wherein the means for sending the aggregated engagement level indicator include means for sending a plurality of aggregated engagement level indicators corresponding to the plurality of members.

In Example 49, the subject matter of any one or more of Examples 39-48 optionally include wherein the aggregated engagement level indicator is an emoticon.

In Example 50, the subject matter of any one or more of Examples 39-49 optionally include wherein the aggregated engagement level indicator is a 3D avatar.

In Example 51, the subject matter of any one or more of Examples 39-50 optionally include wherein the overall engagement of the audience to the speech is a weighted average of engagement of the plurality of members of the audience.

In Example 52, the subject matter of any one or more of Examples 39-51 optionally include wherein the means for sending the aggregated engagement level indicator include means for sending a series of aggregated engagement level indicators in real time updates to the speaker device, the real time updates adjusted based on received aggregated or individual updated audience reaction information.

In Example 53, the subject matter of any one or more of Examples 39-52 optionally include means for saving the processed information and the speech to memory; and means for correlating audio tones or key words in the speech with emotional responses in the processed information using machine learning, wherein the means for correlating include means for using a time offset to account for a transmission delay.

In Example 54, the subject matter of Example 53 optionally includes means for predicting emotional reactions of a hypothetical audience to a second speech using the correlated audio tones or key words and previous reactions from past audiences stored in the memory.

In Example 55, the subject matter of Example 54 optionally includes means for suggesting modifications to the second speech based on the predicted emotional reactions of the hypothetical audience.

In Example 56, the subject matter of any one or more of Examples 39-55 optionally include means for sending the aggregated engagement level indicator to a device of a member of the plurality of members of the audience.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A system for indicating audience engagement, the system comprising:
    a server, including processing circuitry and memory, the processing circuitry to:
    send speech from a speaker to be played for a plurality of members of an audience;
    receive audience reaction information, for the plurality of members of the audience, from a plurality of sensors, the audience reaction information captured by the plurality of sensors while the speech is playing for the plurality of members of the audience;
    process the audience reaction information to aggregate the audience reaction information;
    determine, using the processed information, an engagement factor;
    send an aggregated engagement level indicator to a speaker device, the aggregated engagement level indicator based on the engagement factor and indicating overall engagement of the audience to the speech;
    save the processed information and the speech to the memory; and
    correlate audio tones or key words in the speech with emotional responses in the processed information, wherein to correlate includes using a time offset to account for a transmission delay.

2. The system of claim 1, wherein the speech includes a video of the speaker.

3. The system of claim 1, wherein the speaker is remote from the audience.

4. The system of claim 1, wherein the plurality of sensors include a camera, the camera to capture physical responses of at least one of the plurality of members of the audience while the speech is playing.

5. The system of claim 4, wherein the physical responses include at least one of a facial emotion, a body gesture, or a hand gesture.

6. The system of claim 1, wherein the plurality of sensors include a wearable sensor, the wearable sensor to capture biometric data from at least one of the plurality of members of the audience while the speech is playing.

7. The system of claim 1, wherein the audience reaction information is received from at least one of the plurality of members of the audience in response to the at least one of the plurality of members of the audience opting in to provide data.

8. The system of claim 1, wherein to process the audience reaction information, the processing circuitry is to anonymize the audience reaction information.

9. The system of claim 1, wherein to determine the engagement factor includes using data of the plurality of members of the audience, the data including at least one of location data, personal data, cultural data, familiarity data, time data, age data, or gender data.

10. The system of claim 1, wherein to send the aggregated engagement level indicator, the processing circuitry is to send a plurality of aggregated engagement level indicators corresponding to the plurality of members.

11. The system of claim 1, wherein the aggregated engagement level indicator is an emoticon.

12. The system of claim 1, wherein the aggregated engagement level indicator is a 3D avatar.

13. The system of claim 1, wherein the overall engagement of the audience to the speech is a weighted average of engagement of the plurality of members of the audience.

14. The system of claim 1, wherein to send the aggregated engagement level indicator, the processing circuitry is to send a series of aggregated engagement level indicators in real time updates to the speaker device, the real time updates adjusted based on aggregated or individual received updated audience reaction information.

15. The system of claim 1, wherein the processing circuitry is further to predict emotional reactions of a hypothetical audience to a second speech using the correlated audio tones or key words and previous reactions from past audiences stored in the memory.

16. The system of claim 15, wherein the processing circuitry is further to suggest modifications to the second speech based on the predicted emotional reactions of the hypothetical audience.

17. The system of claim 1, wherein the processing circuitry is further to send the aggregated engagement level indicator to a device of a member of the plurality of members of the audience.

18. A method for indicating audience engagement, the method comprising:
    sending speech from a speaker to be played for a plurality of members of an audience;
    receiving audience reaction information, for the plurality of members of the audience, from a plurality of sensors, the audience reaction information captured by the plurality of sensors while the speech is playing for the plurality of members of the audience;
    processing the audience reaction information to aggregate the audience reaction information;

determining, using the processed information, an engagement factor;

sending an aggregated engagement level indicator to a speaker device, the aggregated engagement level indicator based on the engagement factor and indicating overall engagement of the audience to the speech;

saving the processed information and the speech to the memory; and correlating audio tones or key words in the speech with emotional responses in the processed information, wherein correlating includes using a time offset to account for a transmission delay.

19. The method of claim 18, wherein the speech includes a video of the speaker.

20. The method of claim 18, wherein the speaker is remote from the audience.

21. The method of claim 18, wherein the plurality of sensors include a camera, the camera capturing physical responses of at least one of the plurality of members of the audience while the speech is playing.

22. At least one non-transitory machine-readable medium including instructions for operation of a computing system, which when executed by a machine, cause the machine to:

send speech from a speaker to be played for a plurality of members of an audience;

receive audience reaction information, for the plurality of members of the audience, from a plurality of sensors, the audience reaction information captured by the plurality of sensors while the speech is playing for the plurality of members of the audience;

process the audience reaction information to aggregate the audience reaction information;

determine, using the processed information, an engagement factor;

send an aggregated engagement level indicator to a speaker device, the aggregated engagement level indicator based on the engagement factor and indicating overall engagement of the audience to the speech;

save the processed information and the speech to the memory; and correlate audio tones or key words in the speech with emotional responses in the processed information, wherein to correlate includes using a time offset to account for a transmission delay.

23. The at least one machine-readable medium of claim 22, wherein the plurality of sensors include a wearable sensor, the wearable sensor capturing biometric data from at least one of the plurality of members of the audience while the speech is playing.

24. The at least one machine-readable medium of claim 22, wherein the audience reaction information is received from at least one of the plurality of members of the audience in response to the at least one of the plurality of members of the audience opting in to provide data in an individual or an aggregated form.

* * * * *